(12) United States Patent
Martin et al.

(10) Patent No.: US 11,737,390 B2
(45) Date of Patent: Aug. 29, 2023

(54) HARVESTING HEADER MULTI-SENSOR HEIGHT CONTROL

(71) Applicant: CNH Industrial America LLC, New Holland, PA (US)

(72) Inventors: Jethro Martin, Ephrata, PA (US); Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 331 days.

(21) Appl. No.: 17/182,780

(22) Filed: Feb. 23, 2021

(65) Prior Publication Data

US 2022/0264798 A1   Aug. 25, 2022

(51) Int. Cl.
*A01D 41/14* (2006.01)

(52) U.S. Cl.
CPC .................................. *A01D 41/141* (2013.01)

(58) Field of Classification Search
CPC .. A01D 41/141; A01D 41/145; A01D 34/283; A01D 34/286
See application file for complete search history.

(56) References Cited

U.S. PATENT DOCUMENTS

| | | | |
|---|---|---|---|
| 3,722,193 A | 3/1973 | Strubbe | |
| 5,359,836 A * | 11/1994 | Zeuner | A01D 41/141 56/208 |
| 5,577,373 A * | 11/1996 | Panoushek | A01D 41/141 56/DIG. 15 |
| 5,713,190 A | 2/1998 | Vermeulen et al. | |
| 7,730,700 B2 * | 6/2010 | Nathan | A01D 41/141 56/10.2 E |
| 9,345,191 B2 | 5/2016 | Kohlhase et al. | |
| 9,668,412 B2 | 6/2017 | Ritter et al. | |
| 10,349,578 B2 | 7/2019 | Cook | |
| 10,736,265 B2 | 8/2020 | Fuchtling et al. | |
| 10,959,374 B2 * | 3/2021 | Duerksen | A01D 41/141 |
| 2004/0006958 A1 | 1/2004 | Thiemann et al. | |
| 2006/0242935 A1 * | 11/2006 | Rayfield | A01D 41/141 56/10.2 E |
| 2008/0155954 A1 | 7/2008 | Schlipf | |

(Continued)

FOREIGN PATENT DOCUMENTS

| | | | |
|---|---|---|---|
| WO | 81/01938 A1 | 7/1981 | |
| WO | WO-8203310 A * | 10/1982 | ........... A01D 41/141 |

OTHER PUBLICATIONS

International Search Report and Written Opinion for Application No. PCT/US2022/017295 dated May 24, 2022 (15 pages).

*Primary Examiner* — Adam J Behrens
*Assistant Examiner* — Julia I Bartlett-Sloan
(74) *Attorney, Agent, or Firm* — Peter K. Zacharias

(57) ABSTRACT

Method and apparatus for controlling the height of a header for use with an agricultural harvester. The header height is controlled by receiving orientation values from a first set of sensors representing orientation of respective support arms of the header, receiving height values from a second set of sensors representing height of the respective support arms with respect to ground, combining the height values and orientation values for each support arm to create a respective multi-sensor value, and controlling the position of the header with respect to the agricultural harvester responsive the multi-sensor value.

20 Claims, 10 Drawing Sheets

(56) References Cited

U.S. PATENT DOCUMENTS

| | | |
|---|---|---|
| 2018/0070531 A1 | 3/2018 | Long |
| 2018/0168101 A1 | 6/2018 | Fuchtling et al. |
| 2019/0297775 A1* | 10/2019 | Fuechtling ............. A01D 34/04 |
| 2020/0163277 A1* | 5/2020 | Cooksey ............... A01D 41/127 |
| 2021/0212248 A1* | 7/2021 | Kong ................... A01D 41/144 |

* cited by examiner

HARVESTING HEADER MULTI-SENSOR HEIGHT CONTROL

FIELD OF THE INVENTION

Examples of the present invention relate generally to a header of an agricultural harvester (i.e., a plant cutting machine) and, more specifically, to determining and controlling the height of the header above ground level.

BACKGROUND OF THE INVENTION

An agricultural harvester, such as, but not limited to, a combine or a windrower, generally includes a header operable for severing and collecting plant or crop material as the harvester is driven over a crop field. A cutter bar, supported by support arms of the header, severs the plant or crop material and a conveying mechanism (such as an auger or draper belt) transports the severed plant or crop material to the agricultural harvester. In order to minimize harvesting time, the width of the header has been increased over the years to harvest more crop during each pass of the harvester.

Many conventional headers have at least two modes of operation. In a first mode of operation, the support arms are fully raised and the cutter bar operates at a fixed position with respect to the header. This mode may be referred to as a fixed cutting mode. In a second mode of operation, the support arms are lowered and allowed to travel along the ground with only enough support to prevent the support arms from digging into the crop field. Due to fluctuations in the ground surface, the support arms move up and down. The cutter bar is flexible to move along with the support arms. This mode may be referred to as a flexible cutting mode. The height of the header (or portions thereof) above ground is monitored using sensors on the control arms or feeler arms that extend from the support arms.

SUMMARY OF THE INVENTION

A harvesting apparatus that includes a harvester, a header coupled to the harvester, the header including support arms supporting a cutter bar, a first set of sensors configured and positioned to generate orientation values representing orientation of respective support arms, a second set of sensors corresponding to the first set of sensors configured and positioned to generate height values representing height above ground of the respective support arms, positioning machinery configured to selectively position at least one aspect of the header with respect to the harvester; and a controller coupled to the sensors and the positioning machinery to receive the orientation and height values, combine the corresponding orientation and height values for each support arm, and control the positioning machinery to position the header responsive to the combined values.

A method for controlling a header of an agricultural harvester, the header including a plurality of support arms supporting a cutter bar. The header is controlled by receiving orientation values for the support arms, receiving height values for the support arms, combining the corresponding orientation and height values for each of the support arms, and controlling positioning machinery of the agricultural harvester to position the header responsive to the combined orientation and height values.

BRIEF DESCRIPTION OF THE DRAWINGS

For the purpose of illustration, there are shown in the drawings some examples of the invention. It should be understood, however, that the invention is not limited to the precise arrangements, dimensions, and instruments shown. Like numerals indicate like elements throughout the drawings. When more than one of the same or similar elements are depicted a common reference number may be used with a letter designation corresponding to respective elements. When the elements are referred to collectively or a non-specific element is referenced, the letter designation may be omitted. In the drawings.

DETAILED DESCRIPTION OF THE INVENTION

Figure 1:
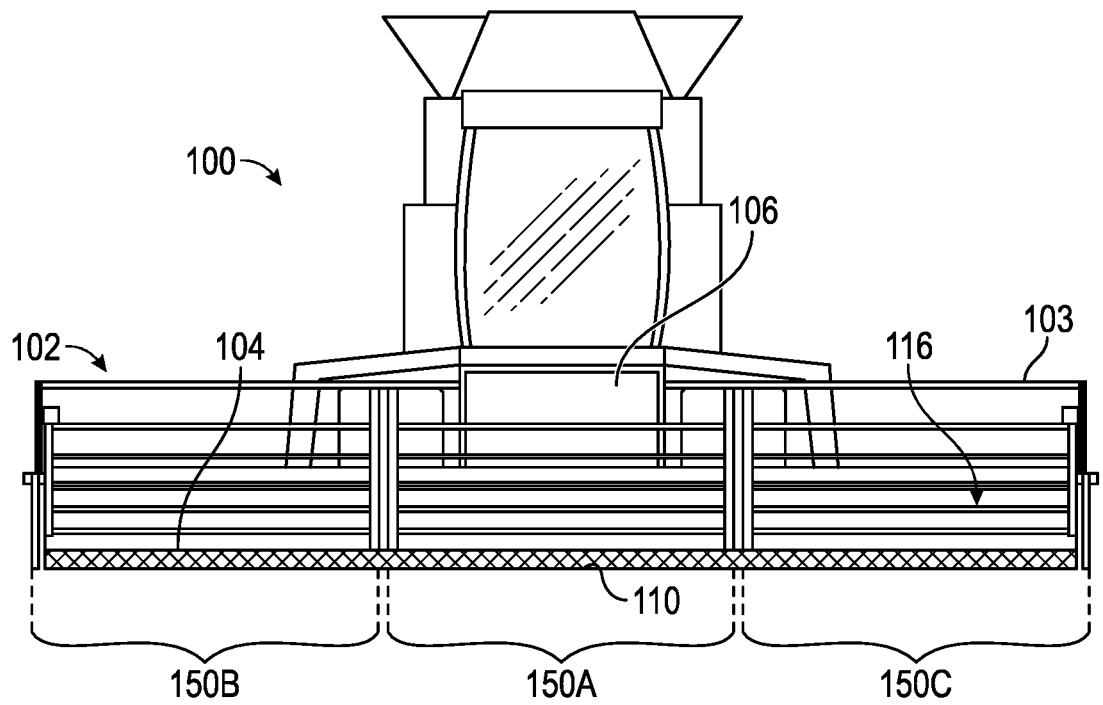
FIG. 1 is a front view of a harvester with attached articulating header in accordance with examples described herein.

Reference will now be made in detail to the various examples of the disclosed subject matter illustrated in the accompanying drawings. According to examples described herein, the height of a header above ground is detected based on a combination of sensor values. The header is configured for use with a harvester. The header includes multiple support arms that support a cutter bar. A first set of sensors generate an orientation value for respective support arms and a second set of sensors generate a height value for the respective support arms. For a particular support arm, a respective orientation value and a respective height value are combined to produce a multi-sensor value. The multi-sensor values of the multiple support arms are then processed to generate values for controlling positioning machinery (e.g., hydraulic cylinders) to control aspects of the header (e.g., height and orientation).

Certain terminology is used in the following description for convenience only and is not limiting. Directional terms such as top, bottom, left, right, above, below, and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The term "crop material" is used throughout the specification for convenience and it should be understood that this term is not intended to be limiting. The header of the subject application is applicable to a variety of crops, including but not limited to wheat, soybeans, and small grains.

The term "coupled" as used herein refers to any logical, optical, physical, or electrical connection, link, or the like by which signals or light produced or supplied by one system element are imparted to another coupled element. Unless described otherwise, coupled elements or devices are not necessarily directly connected to one another and may be separated by intermediate components, elements or communication media that may modify, manipulate, or carry the signals or light.

The term "about" as used herein when referring to a measurable value such as an amount, a temporal duration, and the like, is meant to encompass variations of ±20%, ±10%, ±5%, ±1%, or ±0.1% from the specified value, as such variations are appropriate.

The term "substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as a limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages, and characteristics of the examples of the subject disclosure may be combined in any suitable manner in one or more embodiments. One skilled in the relevant art will recognize, in light of the description herein, that the subject disclosure can be practiced without one or more of the specific features or advantages of a particular example. In other instances, additional features and advantages may be recognized in certain embodiments that may not be present in all examples of the present disclosure.

Referring now to the drawings, FIG. 1 illustrates an agricultural harvester 100 for harvesting crop material in accordance with an example of the present disclosure. For exemplary purposes only, the agricultural harvester is illustrated as a combine harvester. The harvester 100 includes a header 102 attached to a forward end of the harvester, which is configured to cut crops, including (without limitation) small grains (e.g., wheat, soybeans, grain, etc.), and to induct the cut crops into a feeder house 106 as the harvester moves forward over a crop field.

The header 102 is an articulating header including a center segment 150A, a right wing segment 150B adjacent a right side of the center segment 150A, and a left with segment 150C adjacent a left side of the center segment. The center segment 150A is positioned in front of the feeder house 106 and may be raised/lowered with respect to the harvester 100. The right wing segment 150B and the left wing segment 150C may be raised/lowered to conform to the surface of the crop field. During normal operation, all three segments 150A/150B/150C are engaged in harvesting crop material from the crop field (referred to herein as the "operational state"). In certain situations, such as in an unusually wet/muddy portion of the crop field, the right and/or left wing segments 150B are raised such that they no longer effectively capture crop (referred to herein as a "raised state") in order to prevent the header 102 from getting bogged down in the crop field.

The header 102 includes a frame 103 having a floor 104 that is supported in desired proximity to the surface of a crop field. The center, right, and left segments 150A, 150B, and 150C extend transversely along a forward edge of the floor 104, i.e., in a widthwise direction of the harvester. The center, right, and left segments 150A, 150B, and 150C are configured to cut crops in preparation for induction into the feeder house 106. The header 102 may include one or more draper conveyor belts for conveying cut crops to the feeder house 106, which is configured to convey the cut crops into the harvester for threshing and cleaning as the harvester 100 moves forward over a crop field. The header 102 may include an elongated, rotatable reel 116 which extends above and in close proximity to the segments 150A, 150B, and 150C. The rotatable reel 116 is configured to cooperate with the one or more draper conveyors in conveying cut crops to the feeder house 106 for threshing and cleaning. According to an example as shown in FIG. 1, a cutter bar 110 is positioned in front of the segments 150A, 150B, and 150C.

Figure 2A:
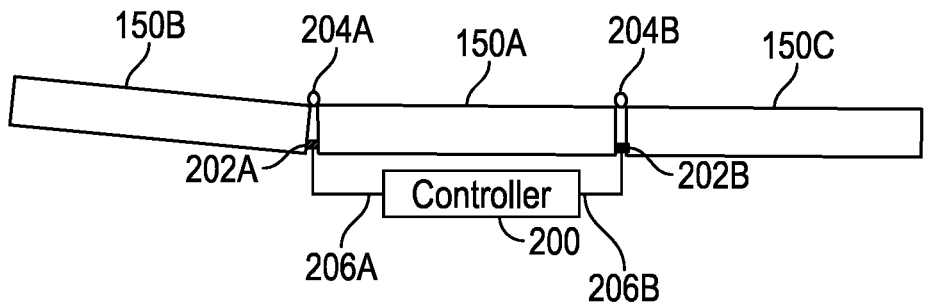
FIGS. 2A, 2B, 2C, and 2D are views of four respective states of an articulating header in accordance with examples described herein.
Figure 2B:
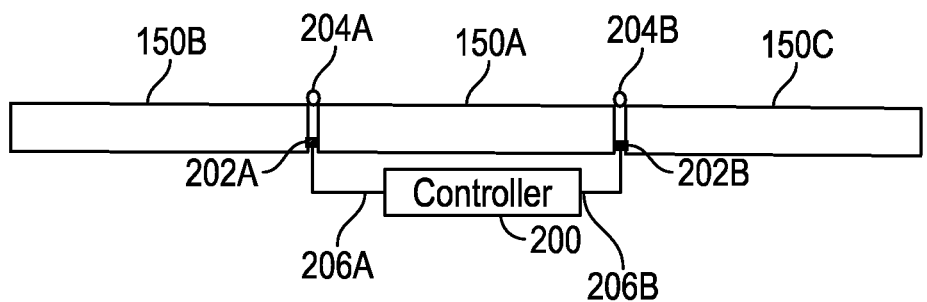
Figure 2C:
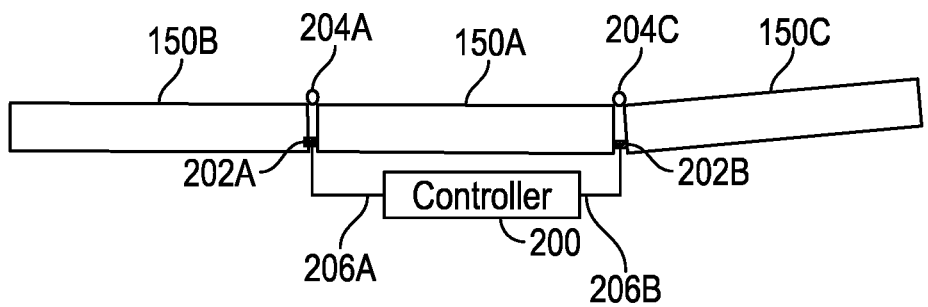
Figure 2D:
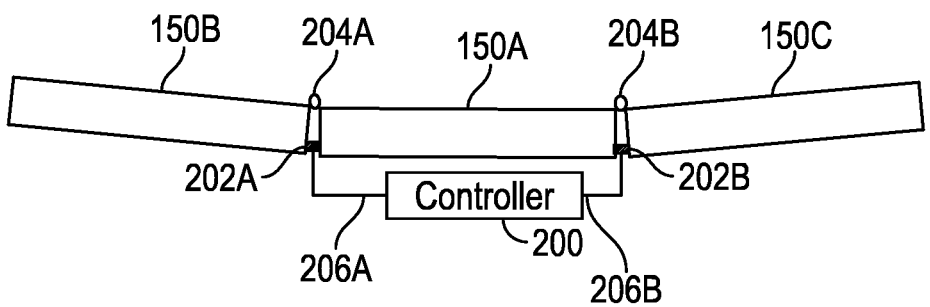

FIGS. 2A, 2B, 2C, and 2D depict the header 102 with its segments 150 in various states of operation. FIG. 2A depicts the header 102 with the center segment 150A and the left segment 150C in an operational state, and the right segment 150B in a non-operational state. FIG. 2B depicts the header 102 with all segments 150 in the operational state. FIG. 2C depicts the header 102 with the center segment 150A and the right segment 150B in an operational state, and the left segment 150C in a non-operational state. FIG. 2D depicts the header 102 with the center segment 150A in an operational state, and the left segment 150C and the right segment 150B in non-operational states.

In one example, the harvester 100 and header 102 include positioning machinery for controlling the height and orientation of the header with respect to the crop field. The positioning machinery, in accordance with one example, includes a hydraulic control apparatus 200 and hydraulic cylinders 202 (e.g., wing frame cylinders). The hydraulic control apparatus 200 (e.g., under control of a microprocessor of the harvester 100 or located in the header 102) controls a first hydraulic cylinder 202A positioned between the center segment 150A and the right segment 150B and a second hydraulic cylinder 202A positioned between the center segment 150A and the left segment 150C. The controller 200 controls the flow of hydraulic fluid through respective first and second fluid lines 206A and 206B to the first and second hydraulic cylinders 202A and 202B.

Increasing the pressure in the first fluid line 206A causes the hydraulic cylinder 202A to extend, which results in the right wing segment 150B raising with respect to the center segment 150A (and into a non-operational state) as it rotates about a pivot point 204A therebetween. Decreasing the pressure in the first fluid line 206A causes the hydraulic cylinder 202A to retract, which results in the right wing segment 150B lowering with respect to the center segment 150A (and into an operational state). Increasing the pressure in the second fluid line 206B causes the hydraulic cylinder 202B to extend, which results in the left wing segment 150C raising with respect to the center segment 150A (and into a non-operational state) as it rotates about a pivot point 204B therebetween. Decreasing the pressure in the second fluid line 206A causes the hydraulic cylinder 202B to retract, which results in the left wing segment 150C lowering with respect to the center segment 150A (and into an operational state).

In one example, additional hydraulic cylinders (not shown; e.g., harvester feeder raise/lower cylinders) are positioned between the center segment 150A and the harvester to raise, lower, and tilt the center segment 150A with respect to the harvester for further control of the height and orientation of the header 102 with respect to the crop field. Increasing the pressure to a hydraulic cylinder causes that hydraulic cylinder to extend, which results in a corresponding portion of the center segment 150A raising with respect to the harvester. Decreasing the pressure to a hydraulic cylinder causes that hydraulic cylinder to retract, which results in a corresponding portion of the center segment 150A lowering with respect to the harvester.

Figure 3A:
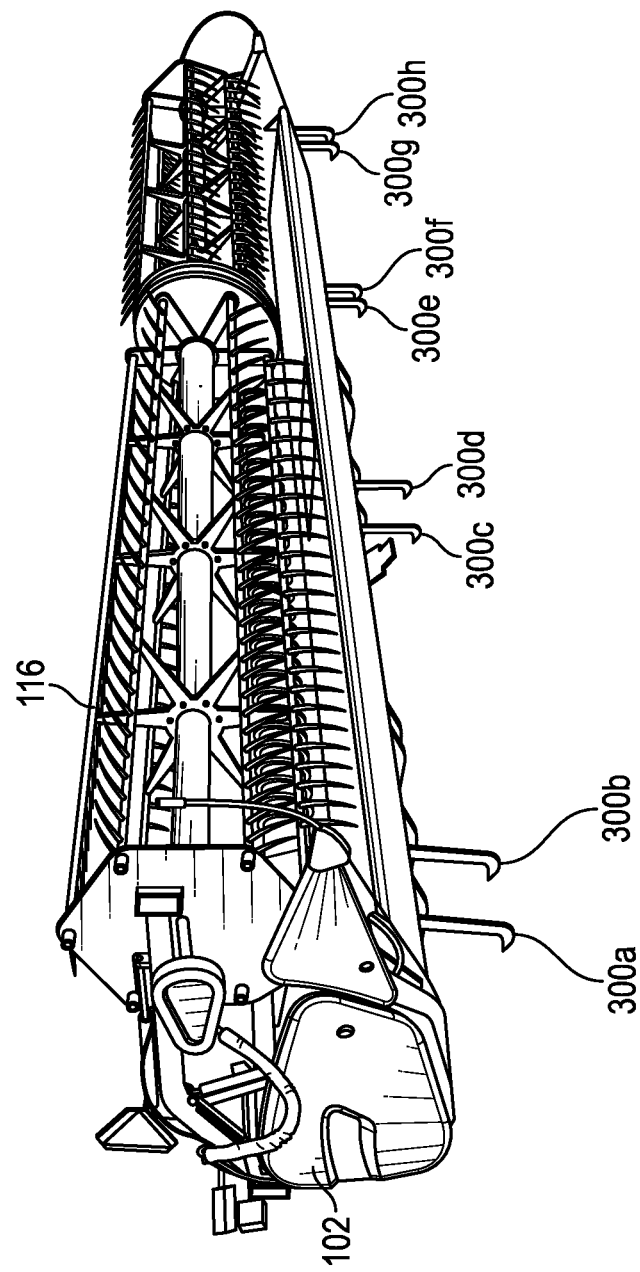
FIG. 3A is a perspective view of a header illustrating pairs of height sensors in accordance with examples described herein.
Figure 3B:
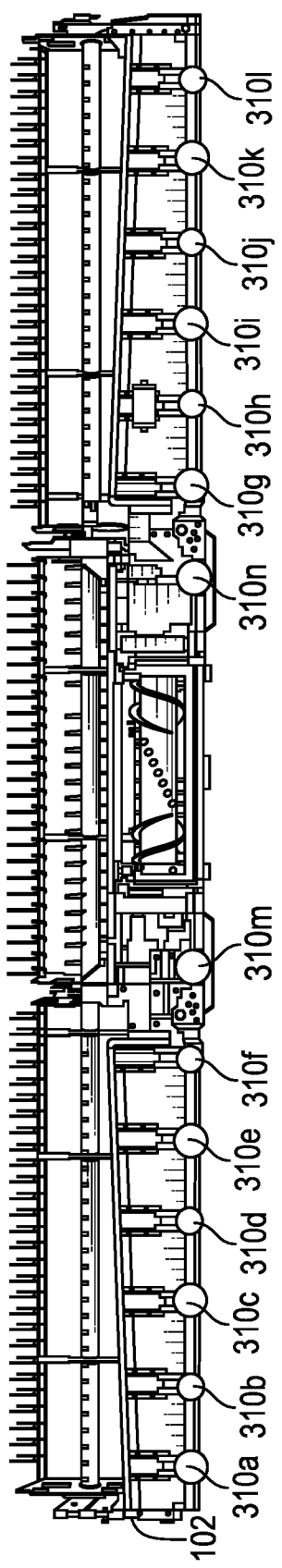
FIG. 3B is a rear view of a header illustrating positioning of height and orientation sensors along the width of the header in accordance with examples described herein.

FIG. 3A depicts a two-segment header 102 from a perspective view with height sensors 310 extending from a bottom portion of the header. In the illustrated embodiment, the height sensors include feeler arms 300 (feeler arms 300a-h). FIG. 3B depict a three-segment header 102 with sensors (e.g., height sensors and orientation sensors) across the width of the header at sensor positions 310a-n corresponding to vertical supports of the header frame. In the illustrated embodiments, the sensors may include rotational sensors, feeler arms 300 such as described above with respect to FIG. 3A, another type of sensor such as a laser distance sensor, or a combination thereof. In the illustrated embodiment, each sensor is positioned adjacent a respective support arm (see support arm 400; FIG. 4) of the header.

Figure 4A:
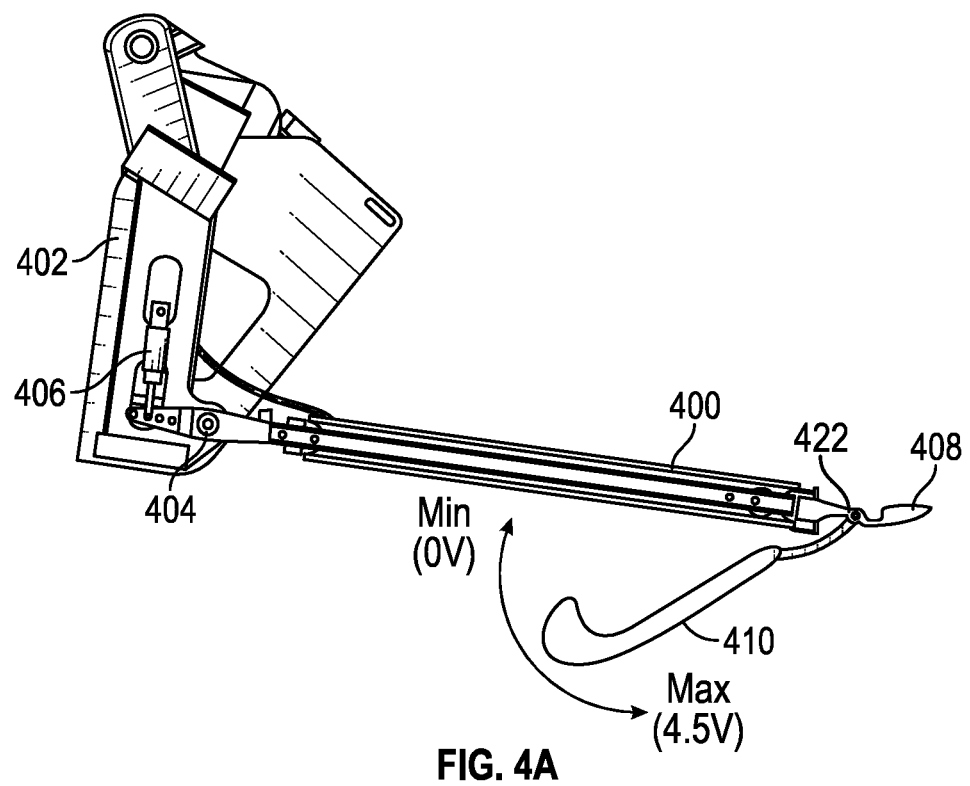
FIG. 4A is an illustration of a height sensor for use in determining the height of a portion of a header above ground using a feeler arm in accordance with examples described herein.

FIG. 4A depicts a support arm 400 with a height sensor embodied as a feeler arm 410 and rotational feeler arm sensor 422, e.g., for "above-ground" cutting in a fixed cutting mode. The support arm 400 is coupled to a support structure 402 of the header 102. The support arm 400 is configured for selective rotation about a pivot point 404 on the support structure 402. A hydraulic float cylinder 406 is coupled to the support arm 400 on one side of the pivot point 404 and a cutter bar 408 is coupled to the support arm 400 on the other side of the pivot point 404.

In one mode of operation (e.g., the fixed cutting mode), the float cylinders 406 are controlled to fully raise all the support arm 400 (and, in turn, the cutter bar 408) to a maximum height. In this mode of operation, the support arms are raised such that they do not move due to fluctuations in the ground surface and the cutter bar remains substantially static. In another mode of operation (e.g., the flexible cutting mode), the float cylinders 406 are controlled to partially offset the weight of their respective support arms 400 and the cutter bar 408 such that the front edge of the header does not dig into the crop field. In this mode of operation, the support arms "float" over the crop field and the cutter bar flexes to accommodate differences in orientation between adjacent float arms.

In one example, the rotational feeler arm sensor 422 is configured to provide a minimum output voltage (e.g., 0 Volts) then the feeler arm 410 is fully raised (i.e., adjacent the support arm). This may occur when the support arm 400 is on the ground or the feeler arm 410 is latched to the support arm 400. The rotation sensor 422 is also configured in this example to provide a maximum output voltage (e.g., a system voltage such as 4.5 Volts) when the feeler arm 410 is fully lowered. This may occur when the feeler arm is hanging from the support arm 400 above the ground. The rotational feeler arm sensor 422 will provide an output voltage between the minimum and maximum values indicative of the amount of rotation when the feeler arm 410 is between the fully raised and fully lowered positions. Thus, the rotational feeler arm sensor 422 produces an output value indicative of the height of the leading edge of the support arm 400 above ground (i.e., a height value).

Figure 4C:
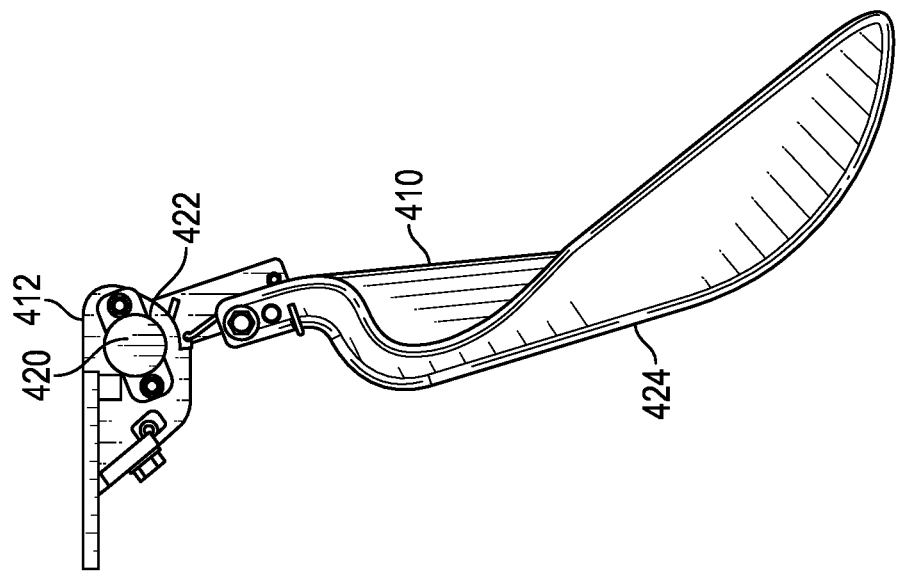
FIG. 4C is a side view of the feeler arm for use in the height sensor of FIG. 4A.
Figure 4B:
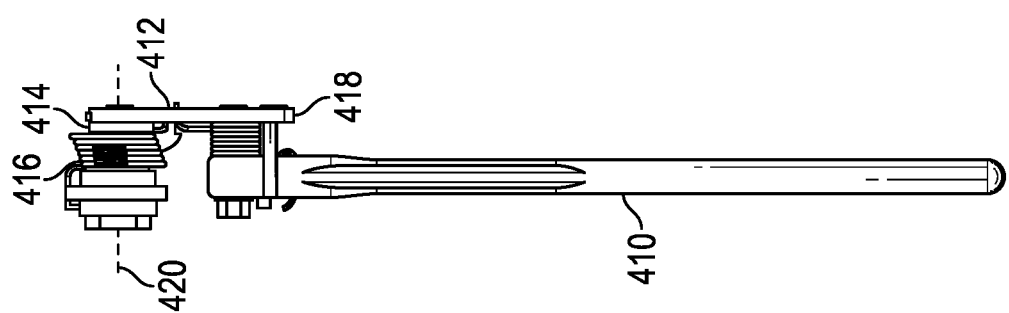
FIG. 4B is a rear view of the feeler arm for use in the height sensor of FIG. 4A.

FIG. 4B depicts the feeler arm 410 from a rear point of view. The feeler arm 410 may be formed using a flexible polymer. This allows the feeler arm 410 to flex, which absorbs shock as the feeler arm 410 is dragged over the ground (thereby extending its useful life). A coupler 412 couples the feeler arm 410 to a bushing at a pivot point 414 on the support arm 400, e.g., near the cutter bar 408. The coupler 412 enables the feeler arm 410 to rotate about a pivot axis 420 extending through the pivot point 414. A down pressure spring 416 urges the feeler arm 410 toward the ground and a reverse spring trip 418 allows the feeler arm 410 to flip forward in the event the harvester is moved in reverse.

FIG. 4C depicts the feeler arm 410 from a side view. The rotational feeler arm sensor 422 (e.g., a proximity sensor such as a Hall effect sensor) is positioned adjacent the pivot point 414 to sense rotation of the feeler arm 410 about the pivot axis 420. Where the rotational feeler arm sensor 422 is a Hall effect sensor, a magnetic field is used to sense rotational angles (which correspond to the distance the portion of the header to which the feeler arm is attached is above ground) without the need for additional moving parts. A forward edge 424 of the feeler arm 410 is curved, which moves the sensing point of the feeler arm 410 forward as the feeler arm nears the ground.

Figure 4D:
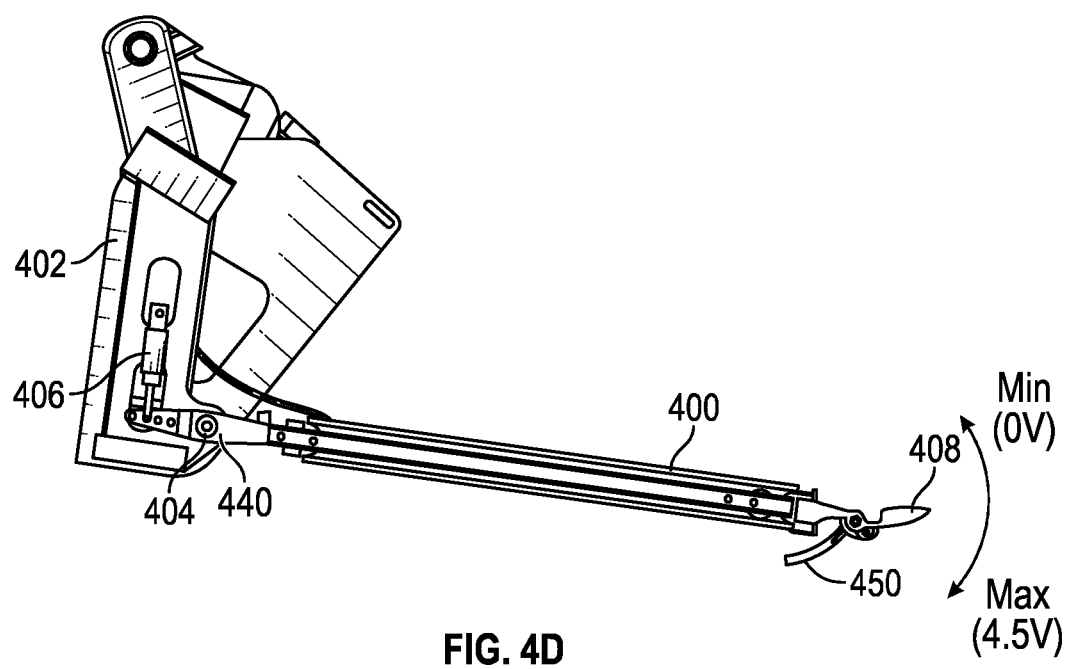
FIG. 4D is an illustration of an orientation sensor for use in determining the orientation of a respective support arm with respect to the header in accordance with examples described herein.

FIG. 4D depicts a support arm 400 with an orientation sensor embodied as a rotational support arm sensor 440 adjacent the pivot point 404 of the support arm 400 for determining an orientation of the support arm 400 with respect to the support structure 402. The support arm 400 rotates about a pivot point 404 on the support structure 402 and includes a skid plate 450 to enable the front of the header 102 to move along the surface of the crop field at ground level. As described above with reference to FIG. 4A, a hydraulic float cylinder 406 coupled to the support arm 400 is controlled to partially offset the weight of its respective support arms 400 and the cutter bar 408 such that the front edge of the header rides on the skid plate 450 and does not dig into the crop field.

In one example, the rotational support arm sensor 440 is configured to provide a minimum output voltage (e.g., 0 Volts) when the support 400 is fully raised. This may occur when the support arm 400 is fully raised for above the ground cutting in a fixed cutting mode or upon the support arm 400 encountering a steep rise in ground elevation. The rotation sensor 440 is also configured in this example to provide a maximum output voltage (e.g., a system voltage such as 4.5 Volts) when the support arm 400 is fully lowered.

This may occur upon the support arm 400 encountering a steep drop in ground elevation. The rotational support arm sensor 440 will provide an output voltage between the minimum and maximum values indicative of the amount of rotation when the support arm 410 is between the fully raised and fully lowered positions. Thus, the rotational support arm sensor 440 produces an output value indicative of the orientation of the support arm 400 (i.e., an orientation value). Combining the height value of the rotational feeler arm sensor 422 (FIG. 4A) with the orientation value of the rotational support arm sensor 440 produces a value indicative of the height of the support structure 402 above ground.

Figure 5:
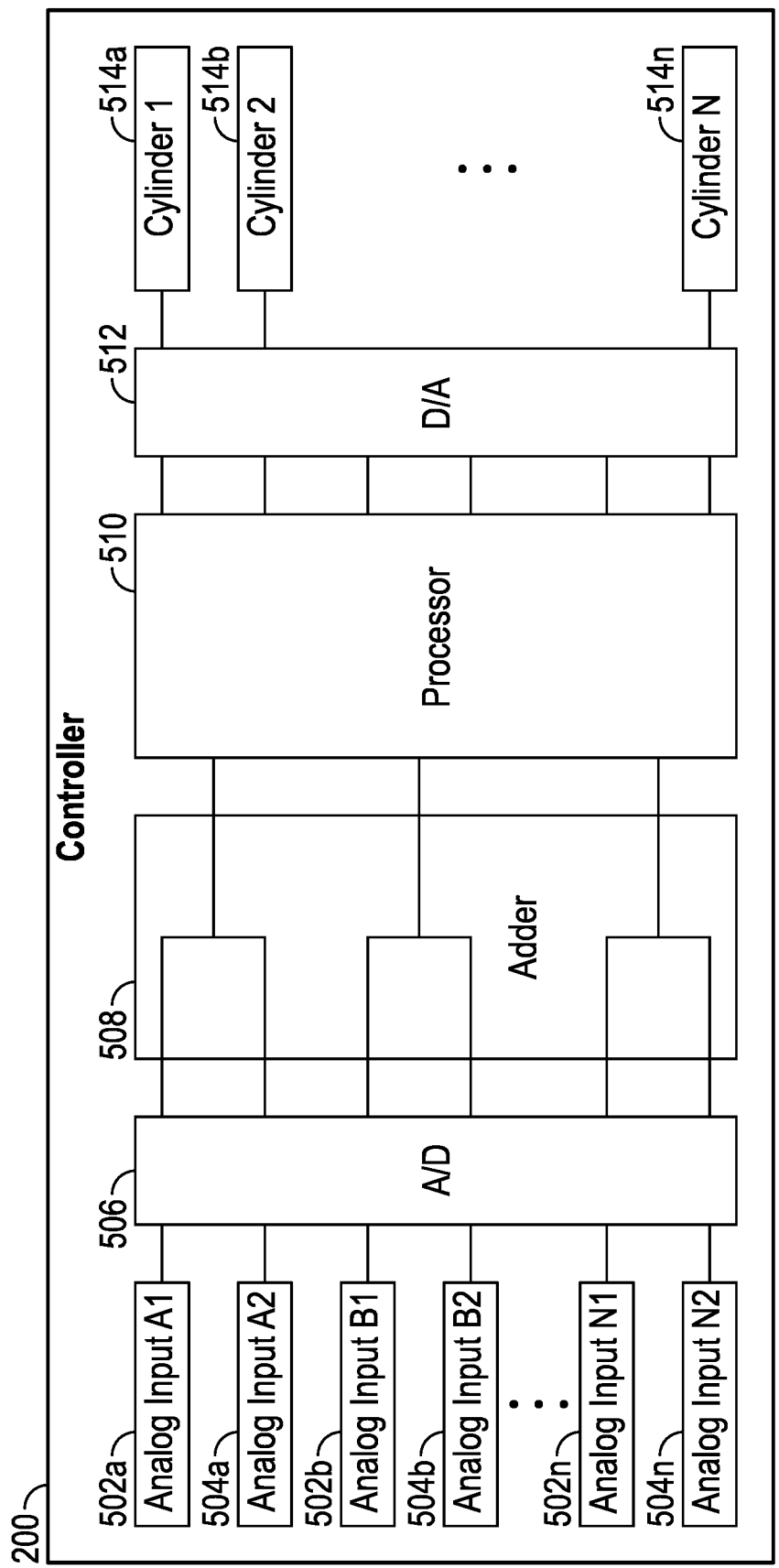
FIG. 5 is a circuit diagrams of a controller for processing sensor information and controlling header height in accordance with examples described herein.

FIG. 5 depicts an example controller 200 for controlling cylinders 202 of the harvester 100 and header 102 (e.g., wing frame cylinders and harvester feeder raise/lower cylinders) to control aspects of the harvester 100 and header 102 to maintain the header 102 and segments 150 thereof at predetermined heights with respect to ground depending on the mode of operation (e.g., fixed cutting mode and flexible cutting mode). Aspects include selectively raising, lower, tilting the header 102 with respect to the harvester 100 (e.g., using harvester feeder raise/lower cylinders) and, in multi-segment headers 102, additionally selectively raising and lowering one or more segments 150 (e.g., using wing frame cylinders).

The controller 200 illustrated in FIG. 5 includes multiple analog inputs 502/504, an analog-to-digital converter (A/D) 506, an adder 508, a processor 510, a digital-to-analog converter (D/A) 512, and multiple analog cylinder outputs 514. Although illustrated as a single integrated circuit, other implementations are contemplated, e.g., discrete components for one or more of the illustrated components. Suitable components for implementing the analog inputs 502/504, analog-to-digital converter (A/D) 506, adder 508, processor 510, digital-to-analog converter (D/A) 512, and multiple analog cylinder outputs 514 will be understood by one of skill in the art from the description herein.

The analog inputs 502/504 receive analog inputs from the height/orientation sensors (e.g., rotational sensors 422/440). In one example, each analog input 502/504 is configured to receive an analog input from a respective one of the rotational sensors 422/440. Some of the analog inputs 502 are coupled to respective rotational sensors 422 and other analog inputs 504 are coupled to respective rotational sensors 440. The A/D converter 506 converts analog signals received from the sensors 422/440 to digital for processing.

An adder 508 combines input values from sensors associated with respective support arms 400. For example, the adder 508 combines an input value from a first rotational feeler arm sensor 422 of a first support arm received at one analog input 502*a* and an input value from a first rotational support arm sensor 440 of the first support arm received at another analog input 504*a* for the first support arm. As such, the adder 508 produces a multi-sensor value for each support arm 400 on which rotational sensors 422/440 are positioned. It is contemplated that the processor 510 (described below) may add the sensor values and, thus, the adder 508 may be omitted in some examples.

The processor 510 processes the multi-sensor values received from the adder 508 to generate signals for controlling the header height (e.g., via hydraulic cylinders 202 such as harvester feeder raise/lower cylinders and/or wing frame cylinders). In one example, the processor determines height of the header in the vicinity of the header where the sensors are located. The processor then determines actual height or an equivalent for adjustment purposes based on, for example, a look-up table stored in memory. Alternatively, the processor may calculate actual height or an equivalent for adjustment purposes using an algorithm retrieved from memory. The processor then generates signals for adjusting the header to maintain the header at a set height responsive to the height values. The processor may raise/lower the entire header, one or both distal segments of a three-part header, or one or more support arms responsive to the height/orientation values from the sensors on the header.

Figure 6:
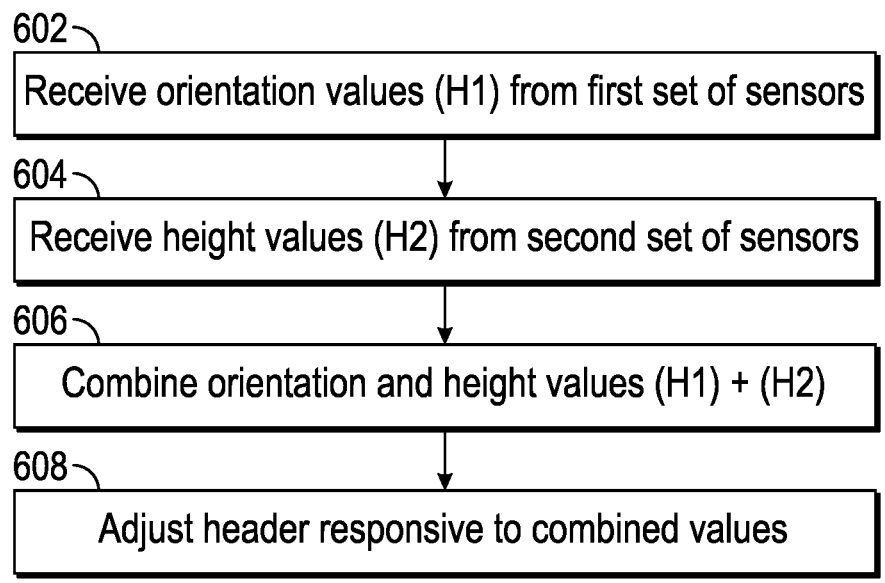
FIG. 6 is a flow chart for depicting a control process for monitoring support arm orientation and height and controlling header height responsive to a multi-sensor values developed from combined orientation sensors and height sensors in accordance with examples described herein.
Figure 7:
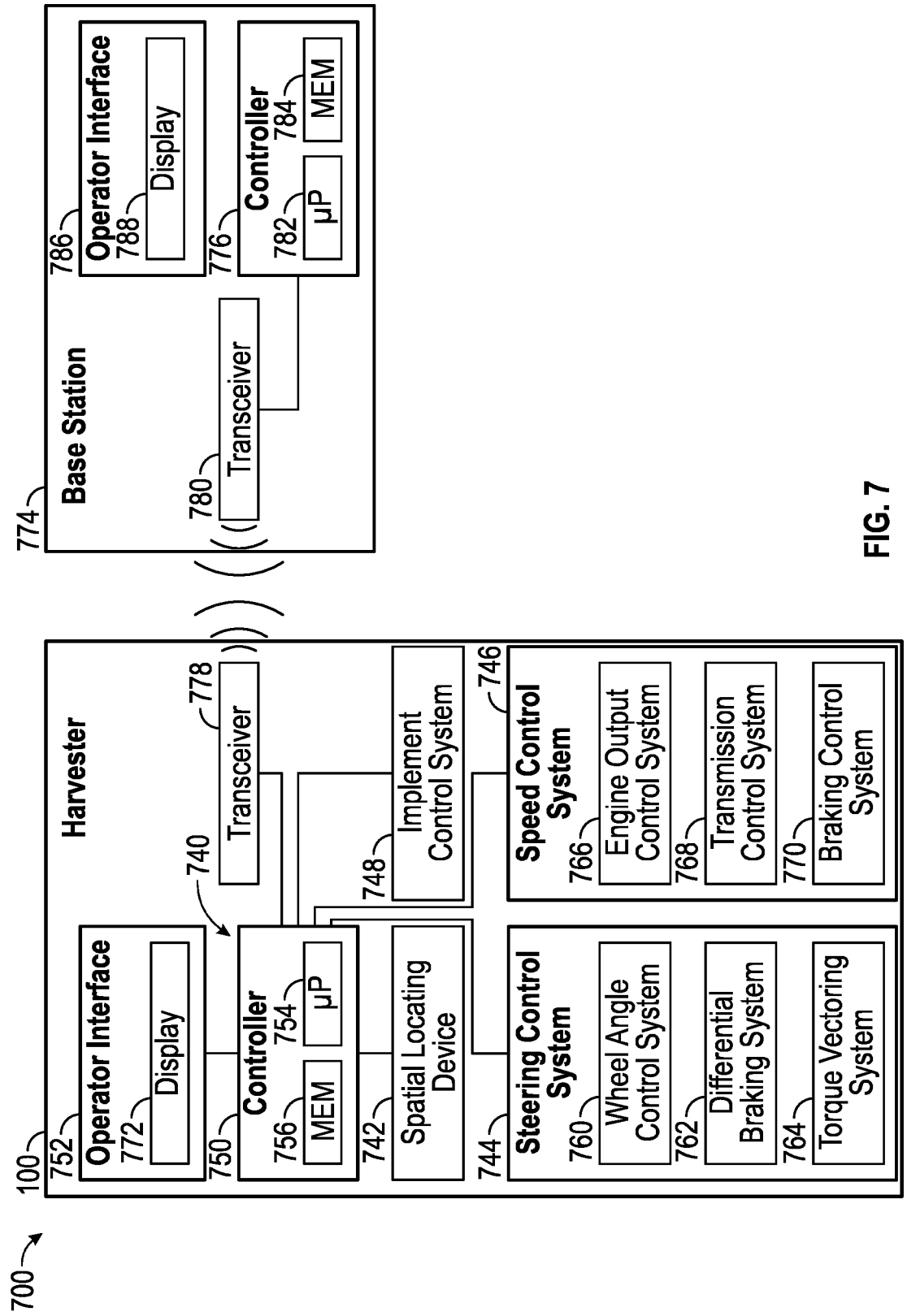
FIG. 7 is a block diagram depicting components for use in implementing apparatus and examples described herein.

FIG. 6 depicts a flow chart 600 of example steps for combining sensor values for use in creating multi-sensor values for controlling aspect of a header during harvesting, e.g., to maintain the header at a predetermined height above ground level. The steps may be performed by a processor (e.g., processor 510; FIG. 5 and/or microprocessor 754 and/or 782; FIG. 7) executing instruction stored in a memory (e.g., memory 756 and/or 784), sensors, and/or circuit described herein. The steps are described with reference to hardware illustrated and described herein, but are not to be limited to such implementations. Although shown as occurring serially, the blocks of FIG. 6 may be reordered or parallelized depending on the implementation. One of skill in the art will understand from the description herein that one or more steps/blocks may be omitted and one or more additional/alternative steps may be incorporated.

At block 602, receive orientation values (H1) from a first set of sensors. In an example, controller 200 receives orientation values from rotational support arm sensors 440 associated with respective support arms 400. Controller 200 may receive the orientation values from the rotational support arm sensors 440 via analog inputs 502 of the controller 200.

At block 604, receive height values (H2) from a second set of sensors. In an example, controller 200 receives height values from rotational feeler arm sensors 422 associated with respective feeler arms 410 of the respective support arms 400. Controller 200 may receive the orientation values from the rotational feeler arm sensors 422 via analog inputs 504 of the controller 200.

At block 606, combine respective orientation values (H1) and height values (H2) for each support arm having sensors to create a multi-sensor value (H1+H2). In one example, an adder 508 combines the respective orientation and height values after conversion to the digital domain by A/D converter 506. In another example, processor 510 combines the values and adder 508 may be omitted.

At block 608, adjust the header height responsive to the combined multi-sensor value. In one example, processor 510 analyzes the multi-sensor values associated with respective support arms 500 and produces signals for controlling cylinders 202 to raise, lower, and tilt the header with respect to the harvester and raise/lower segments of the header to maintain the header/segments at a set height responsive to the multi-sensor values. The processor 510 may produce digital signals that are converted to analog by D/A converter 510 for output on cylinder output ports 414, which are connected to respective cylinder controllers that control hydraulic fluid flow to the cylinders. For example, the processor 510 may produce signals to adjusts the header by raising/lowering the entire header, one or both distal segments of a three-part header, or one or more support arms 400 responsive to the multi-sensor values from the support arm and feeler arm sensors on the header.

FIG. 7 is a schematic diagram of an embodiment of a control system 700 that may be utilized to control the harvester 100, control the header 102 (including reel height), and/or detect crop field parameters (e.g., height for the header above ground by implementing algorithms such as the algorithm depicted and described with reference to FIG. 6). In the illustrated example, the control system 700 includes a vehicle control system 740 (e.g., mounted on the harvester 100). In the illustrated embodiment, the harvester 100 includes a spatial locating device 742, which is mounted to the harvester 100 and is configured to determine a position of the harvester 100. The spatial locating device 742 may also be configured to determine a heading and/or a speed of the harvester 100, for example. As will be appreciated, the spatial locating device 742 may include any suitable system configured to determine the position and/or other characteristics of the harvester 100, such as a global positioning system (GPS) or global navigation satellite system (GNSS), for example.

In the illustrated example, the harvester 100 includes a steering control system 744 configured to control a direction of movement of the harvester 100, and a speed control system 746 configured to control a speed of the harvester 100. The illustrated steering control system includes a wheel angle control system 760, a differential braking system 762, and a torque vectoring system 764 that may be used to steer (e.g., adjust the steering angle of) the harvester 100. The illustrated speed control system 746 includes an engine output control system 766, a transmission control system 768, and a braking control system 770. In addition, the harvester 100 includes an implement control system 748 configured to control operation of an implement (e.g., height of the header 102 and operational states of the header segments 150) and to determine crop field parameters (such as height of the header above ground) from, for example, height sensors coupled to the header 102. Furthermore, the control system 740 includes a controller 750 communicatively coupled to the spatial locating device 742, to the steering control system 744, to the speed control system 746, and to the implement control system 748.

In some examples, the controller 750 is an electronic controller having electrical circuitry configured to process data from the spatial locating device 742, among other components of the harvester 100. In the illustrated example, the controller 750 includes a processor, such as the illustrated microprocessor 754, and a memory device 756. The controller 750 may also include one or more storage devices and/or other suitable components. The processor 754 may be used to execute software, such as software for calculating a target position, iteratively calculating virtual paths, controlling the harvester 100, and so forth. Moreover, the processor 754 may include multiple microprocessors, one or more "general-purpose" microprocessors, one or more special-purpose microprocessors, and/or one or more application specific integrated circuits (ASICS), or some combination thereof. For example, the processor 754 may include one or more reduced instruction set (RISC) processors.

The memory device 756 may include a volatile memory, such as random access memory (RAM), and/or a nonvolatile memory, such as ROM. The memory device 756 may store a variety of information and may be used for various purposes. For example, the memory device 56 may store processor-executable instructions (e.g., firmware or software) for the processor 754 to execute, such as instructions for controlling the harvester 100 (e.g., header height and segment state). The storage device (s) (e.g., a nonvolatile/non-transitory storage medium) may include read-only memory (ROM), flash memory, a hard drive, or any other suitable optical, magnetic, or solid-state storage medium, or a combination thereof. The storage device (s) may store data (e.g., field maps, maps of desired paths, vehicle characteristics, etc.), instructions (e.g., software or firmware for calculating crop field parameters such as header height above ground and any other suitable data.

The implement control system 748 is configured to control various parameters of the agricultural implement towed by or integrated within the harvester 100. For example, in certain examples, the implement control system 748 may be configured to instruct an implement controller (e.g., via a communication link, such as a CAN bus or ISOBUS) to adjust a penetration depth of at least one ground engaging tool of the agricultural implement, which may reduce the draft load on the harvester 100. Furthermore, the implement control system 48 may instruct the implement controller to adjust header height, to transition the agricultural implement between a working position and a transport portion, to adjust a flow rate of product from the agricultural implement, to adjust a position of a header of the agricultural implement (e.g., a harvester, etc.), or to adjust which segments of an articulated header are operational/non-operational, among other operations.

In the illustrated example, the operator interface 752 may be communicatively coupled to the controller 750. The operator interface 752 is configured to present data from the harvester 100 and/or the agricultural implement to an operator (e.g., data associated with operation of the harvester 100, data associated with operation of the agricultural implement, a position of the harvester 100, a speed of the harvester 100, the desired path, the virtual paths, the target position, the current position, etc.) via a display 772. The operator interface 752 may also be configured to enable an operator to control certain functions of the harvester 100 (e.g., starting and stopping the harvester 100, inputting the desired path, raising lower the header, raising/lowering the reel 116 etc.).

It should be appreciated that in certain embodiments, the control system 700 may include a base station 774 having a base station controller 776 located remotely from the harvester 100. For example, in certain embodiments, control functions of the control system may be distributed between the controller 750 of the harvester 100 and the base station controller 776. In some embodiments, the base station controller 776 may perform a substantial portion of the control functions of the control system. For example, in some examples, a first transceiver 778 positioned on the harvester 100 may output signals indicative of vehicle characteristics (e.g., the speed, maximum turning rate, minimum turning radius, steering angle, roll, pitch, rotational rates, acceleration, reel height, or any combination thereof), the position, and/or the heading of the harvester 100 to a second transceiver 780 at the base station 774. The base station control 776 may have a processor 782 and memory device 784 having all or some of the features and/or capabilities of the processor 754 and the memory device 756 discussed above. In some examples, the base station 774 may include an operator interface 786 having a display 788, which may have all or some of the features and/or capabilities of the operator interface 752 and the display 772 discussed above.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A harvesting apparatus comprising:
    a harvester;
    a header coupled to the harvester, the header including a plurality of support arms supporting a cutter bar;
    a first set of sensors comprising a sensor coupled to each support arm, each of the first set of sensors configured and positioned to generate an orientation value representing orientation of a respective one of the plurality of support arms;
    a second set of sensors comprising a sensor coupled to each support arm corresponding to the first set of sensors, each of the second set of sensors configured and positioned to generate a height value representing height above ground of the respective one of the plurality of support arms;
    positioning machinery configured to selectively position at least one aspect of the header with respect to the harvester;
    a controller coupled to the first set of sensors, the second set of sensors, and the positioning machinery, the controller configured to:
        receive the orientation value for each of the plurality of support arms;
        receive the height value for each of the plurality of support arms;
        combine the corresponding orientation and height values for each of the plurality of support arms; and
        control the positioning machinery to position the header responsive to the combined orientation and height values for each of the plurality of support arms.

2. The apparatus of claim 1, wherein each of the support arms includes a support arm pivot point and wherein each of the first set of sensors comprises:
    a rotational support arm sensor positioned to sense rotation about the pivot point.

3. The apparatus of claim 2, wherein the rotational support arm sensor has a minimum value when the support arm is fully raised.

4. The apparatus of claim 3, wherein the minimum value is zero volts.

5. The apparatus of claim 2, wherein each of the second set of sensors comprises:
    a feeler arm pivotally coupled to a respective one of the plurality of support arms at a feeler arm pivot point; and
    a rotational feeler arm sensor positioned to sense rotation about the feeler arm pivot point.

6. The apparatus of claim 5, wherein the rotational support arm sensor has a minimum value when the support arm is fully raised and the rotational feeler arm sensor has a minimum value when the feeler arm is fully raised.

7. The apparatus of claim 6, wherein the minimum values of the rotational support arm sensor and the rotational feeler arm sensor are both zero volts.

8. The apparatus of claim 1, wherein the controller comprises:
    an analog input for each sensor of the first and second sets of sensors;
    an analog to digital converter to covert the orientation values and the height values to digital;
    an adder that combines the corresponding orientation and height values for each of the plurality of support arms;
    a processor that generates digital control values for controlling the header height; and
    a digital to analog converter to convert the digital control values to analog controlling the header height.

9. A header for use with a harvesting apparatus, the header comprising:
    a plurality of support arms supporting a cutter bar;
    a first set of sensors comprising a sensor coupled to each support arm, each of the first set of sensors configured and positioned to generate an orientation value representing orientation of a respective one of the plurality of support arms;
    a second set of sensors comprising a sensor coupled to each support arm corresponding to the first set of sensors, each of the second set of sensors configured and positioned to generate a height value representing height above ground of the respective one of the plurality of support arms;
    a controller coupled to the first set of sensors and the second set of sensors, the controller configured to:
        receive the orientation value for each of the plurality of support arms;
        received the height value for each of the plurality of support arms;
        combine the corresponding orientation and height values for each of the plurality of support arms; and
        send a signal to the harvesting apparatus including the combined orientation and height values for each of the plurality of support arms for use in controlling a height of the header.

10. The header of claim 9, wherein each of the support arms includes a support arm pivot point and wherein each of the first set of sensors comprises:
    a rotational support arm sensor positioned to sense rotation about the support arm pivot point.

11. The header of claim 10, wherein the rotational support arm sensor has a minimum value when the support arm is fully raised.

12. The header of claim 11, wherein the minimum value is zero volts.

13. The header of claim 10, wherein each of the second set of sensors comprises:
    a feeler arm pivotally coupled to a respective one of the plurality of support arms at a feeler arm pivot point; and
    a rotational feeler arm sensor positioned to sense rotation about the feeler arm pivot point.

14. The header of claim 13, wherein the rotational support arm sensor has a minimum value when the support arm is fully raised and the rotational feeler arm sensor has a minimum value when the feeler arm is fully raised.

15. The header of claim 14, wherein the minimum values of the rotational support arm sensor and the rotational feeler arm sensor are both zero volts.

16. The header of claim 9, wherein the controller comprises:
    an analog input for each sensor of the first and second sets of sensors;
    an analog to digital converter to covert the orientation values and the height values to digital;
    an adder that combines the corresponding orientation and height values for each of the plurality of support arms;
    a processor that generates digital control values for controlling the header height; and
    a digital to analog converter to convert the digital control values to analog controlling the header height.

17. A method for controlling a header of an agricultural harvester, the header including a plurality of support arms supporting a cutter bar, the method comprising:
    receiving an orientation value for each of the plurality of support arms from a first set of sensors;

receiving a height value for each of the plurality of support arms from a second set of sensors;

combining the corresponding orientation and height values for each of the plurality of support arms; and controlling positioning machinery of the agricultural harvester to position the header responsive to the combined orientation and height values for each of the plurality of support arms.

18. The method of claim 17, wherein each of the support arms includes a support arm pivot point, each of the first set of sensors comprises a rotational support arm sensor positioned to sense rotation about the pivot point, the rotational support arm sensor has a minimum value when the support arm is fully raised, and the minimum value is zero volts.

19. The method of claim 18, wherein each of the second set of sensors comprises a feeler arm pivotally coupled to a respective one of the plurality of support arms at a feeler arm pivot point and a rotational feeler arm sensor positioned to sense rotation about the feeler arm pivot point, the rotational support arm sensor has a minimum value when the support arm is fully raised and the rotational feeler arm sensor has a minimum value when the feeler arm is fully raised, and the minimum values of the rotational support arm sensor and the rotational feeler arm sensor are both zero volts.

20. The method of claim 17, further comprising:

receiving an analog input for each sensor of the first and second sets of sensors; and converting the received analog signals to digital, wherein the combining combines the corresponding digital signals for each of the plurality of support arms;

wherein the controlling comprises generating digital controller signals, converting the digital control signals to analog, and controlling respective hydraulic cylinders with the analog control signals to control the header height.

* * * * *